3,373,116
RADIOACTIVE FLUOPHOSPHATE GLASS COMPOSITION

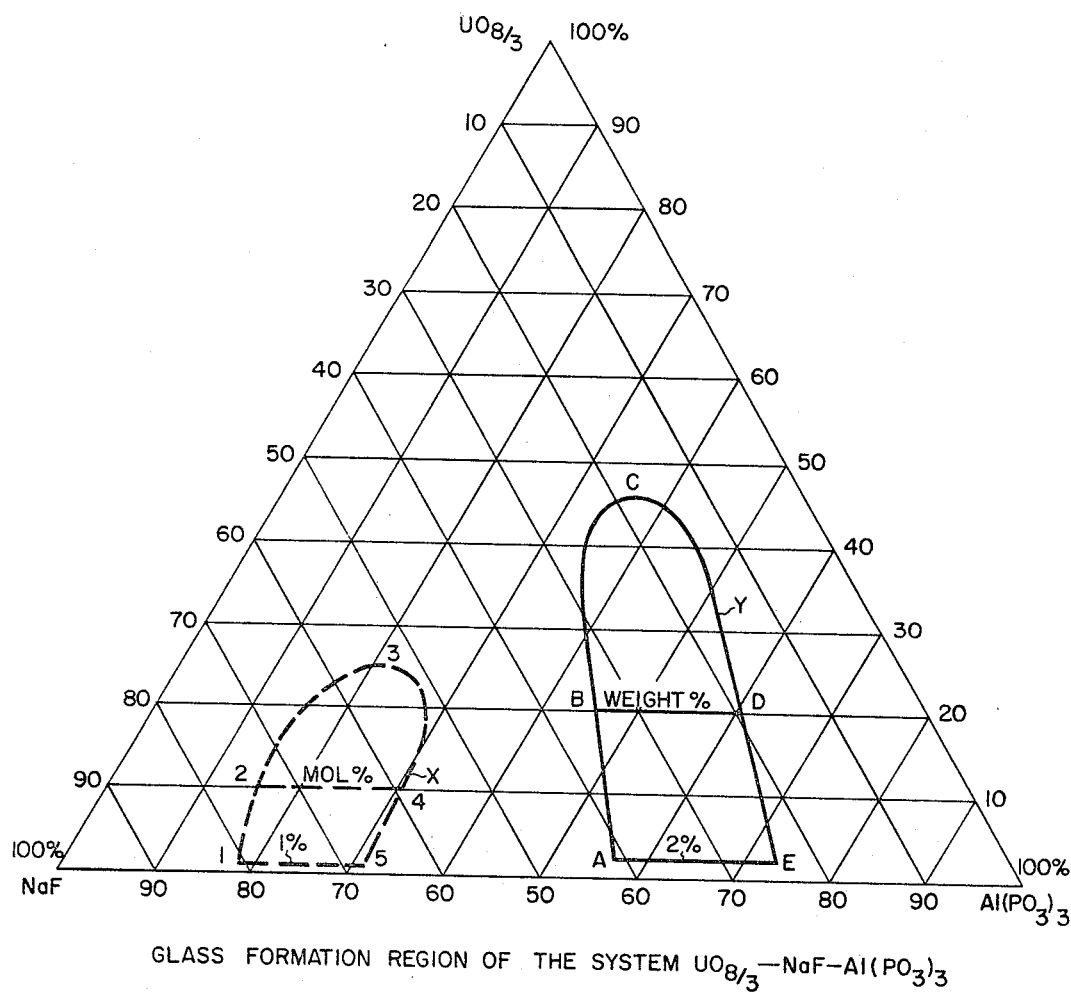
GLASS FORMATION REGION OF THE SYSTEM $UO_{8/3}$—$NaF$—$Al(PO_3)_3$

Kuan-Han Sun, Pittsburgh, Pa., Ching-Tang Chen-Tsai, Hsin-Chu, Taiwan, China, and Yueh Shan, Bloomington, Ind., assignors to Westinghouse Electric Corporation, Pittsburgh, Pa., a corporation of Pennsylvania
Filed Mar. 15, 1965, Ser. No. 439,536
19 Claims. (Cl. 252—301.1)

This invention relates to glass containing uranium, and more particularly it pertains to fluophosphate glass having an unusually high content of uranium.

Uranium contained in glass either in the form of thin glass fibers or small glass particles has been proposed as a fuel for nuclear reactors. In either form, glass is a convenient means for introducing uranium into a reactor. During fission, uranium breaks down into fission fragments most of which travel only a short distance (about ½ mil or less) which is sufficient to escape from the individual glass fibers or particles. The released fission fragments are then free to provide a highly ionizing energy source for chemical reactions.

Prior attempts to introduce large amounts of uranium into a glass have resulted only in maximum concentrations of 20% of uranium by weight. Such concentrations have not been sufficient to sustain fission in a limited space. The present invention provides a glass having over 40% uranium by weight which will facilitate the sustaining of fission in a nuclear reactor.

From earliest times the basis of glass technology has involved reacting various mixtures of silica, soda, and lime combined in a relatively narrow range of compositions. One difficulty with silicate mixtures particularly when uranium is introduced, however, has been a requirement of high temperatures, of the order of 2000° C., for melting such glasses. This is higher than is normally available in most ordinary laboratory furnaces and is difficult to obtain in many industrial furnaces. Another difficulty has been introducing more than 20% of uranium into a silicate type of glass having and retaining the vitreous state.

It has been found that certain phosphates and fluorides may be combined with certain uranium compounds to provide a glass having a relatively low melting point and containing large amounts of uranium. In particular aluminum or beryllium phosphates, with alkali metal fluoride or oxide may be combined with an oxide or fluoride of uranium to provide a homogeneous glass with a sufficiently high level of uranium to sustain fission in a nuclear reactor. Thorium oxide or plutonium oxide may be substituted for at least a part of the uranium compound.

Accordingly, it is a general object of this invention to provide a fluophosphate glass containing a sufficient percentage of uranium to sustain fission in a nuclear reactor.

It is another object of this invention to provide a fluophosphate glass containing up to about 40% elemental uranium, or 46% of uranium oxide by weight.

It is another object of this invention to provide a fluophosphate glass having a relatively low melting point for facilitating the preparation of batch mixtures containing approximately 40% elemental uranium, or 46% of uranium oxide by weight.

Finally, it is an object of this invention to provide a fluophosphate glass that accomplishes the foregoing objects and requirements in a simple and effective manner.

For a better understanding of the nature and objects of the invention, reference should be had to the following detailed description and drawing in which the single figure is a triaxial diagram plotting glass composition on a mol and weight percentage basis.

Broadly, the glasses containing uranium are basically three component fluophosphate glasses. The phosphate component of the glass comprises aluminum or beryllium phosphate, or mixtures of the two, as a major component by weight. The fluoride may be present as an alkali metal fluoride in which event it comprises from 52 to 82 mol percent of the glass, or uranium fluoride. When alkali metal fluoride is present it is preferred that at least the major proportions of the uranium be present as $UO_{8/3}$ ($U_3O_8$), or $UO_2$, or $UO_3$, or mixtures of two or more of such oxides. For the purpose of this invention $U_3O_8$ is designated as $UO_{8/3}$. When the uranium is present as $UF_4$, the glass preferably comprises as the third component a monovalent metal oxide or a bivalent metal oxide, such for example as sodium oxide, potassium oxide, magnesium oxide, calcium oxide, strontium oxide, barium oxide, and zinc oxide, and mixtures of two or more.

The preferred fluophosphate glass of the present invention preferably includes but is not limited to mixtures of from 15 to 30 mol percent of $Al(PO_3)_3$, from 52 to 80 mol percent of NaF, and from 1 to 25 mol percent of $UO_{8/3}$, namely, the area within curve X of the triaxial diagram of the drawing. On a weight basis, the aluminum phosphate comprises from 34 to 75%, sodium fluoride comprises from 15% to 43%, and the uranium oxide from 2 to 46%, represented by curve Y of the drawing. Beryllium phosphate may be used as a "glass former" instead of aluminum phosphate by replacing all or a part of the latter on an equimol basis. Fluorides of the other alkali metals may be substituted for all or a part of a sodium fluoride, namely, the fluorides of lithium, potassium, rubidium, and cesium. Moreover, $UO_2$, $UO_3$, and $UF_4$ may be substituted for all or a part of the $UO_{8/3}$.

The main elements in chemically combined form used in the glass compositions are: $M_1$, $M_2$, Al, P, U, F and O, where $M_1$ is an alkali metal or a combination of two or more monovalent alkali metals, and $M_2$ is a bivalent element, including Be, or a combination of bivalent elements. A small amount of the oxide or fluoride of any other element or elements may be added to this system so long as it does not detrimentally affect the formation of glass by $Al(PO_3)_3$ and NaF reacting with the uranium compound.

The uranium may be natural uranium or enriched uranium, for example 10% enriched. Depleted uranium may be used if a glass for non-reactive purposes is desired.

The preferred systems are $UO_{8/3}$-NaF-$Al(PO_3)_3$, and $UF_4$-$M_2O$-$Al(PO_3)_3$. The specific system $$UO_{8/3}\text{-NaF-}Al(PO_3)_3$$

is discussed in the examples below.

It is known that the individual compounds $UO_{8/3}$, NaF, or $Al(PO_3)_3$ alone will not form a glass when cooled from the liquid melt. However, with a suitable combination, in the proportions indicated above, of these compounds a glass results by melting the mixtures of the compounds and cooling to room temperature. The melts are usually prepared in platinum crucibles within a temperature range of from 800° C. to 1350° C. With higher proportions of sodium fluoride or other monovalent alkali metal fluorides, the melt temperatures are progressively lower. With higher proportions of $UO_{8/3}$, $UF_4$, $M_2$ metals, or $Al(PO_3)_3$, the melt temperatures are higher. The time of melting depends upon the amount and composition of mixture. For a 50-gram melt a time of about five minutes under stirring is usually sufficient. Larger melts will require longer times up to an hour.

The control of temperature and time is important. To avoid vaporization of some of the fluorides the liquid melt should not be heated to too high temperatures or too long. After the melt becomes a clear liquid, it is stirred to uniformity and poured into a mold that has been previously heated to a temperature ranging from 350° C. to 500° C. to prevent cracks in the solidified glass body. On cooling, a greenish glass ordinarily results.

The drawing is a ternary diagram of the ternary system $UO_{8/3}$-NaF-Al(PO$_3$)$_3$ with the solid curve Y showing the glass forming region in weight percent and the dashed curve X showing mol percent. If larger amounts of glass are melted, it is preferred to employ compositions within the borders of curves X and Y by one or two percent in order to secure a good vitreous product. As indicated in the diagram, the amount of $UO_{8/3}$ that can be introduced in the glass can be as high as 46% by weight, corresponding to over 40% of uranium. Preferred compositions are within the portion B–C–D of curve Y, or portion 2–3–4 of curve X. Other alkali metal fluorides may be substituted on a mol for mol basis for the sodium fluoride.

The table gives the compositions and density of some high uranium-containing glasses, as well as two compositions with no uranium, wherein the melt charge composition is given.

This specific glass system may be modified to yield glasses of other desirable properties. For example, other alkali metal fluorides such as potassium fluoride may be used in place of, or in addition to, NaF. $B_2O_3$ may be added in small amounts to the glasses of the invention. $ThO_2$ or plutonium oxide, or both, may be substituted for a part of the $UO_{8/3}$ for instance up to 40% by weight. Phosphates other than the meta-phosphate may be used. All such variations may be included to give improved results without deviating from the spirit of the present invention. Small amounts of the order of a few percent of other components such as $SiO_2$ may be added without altering the basic effectiveness of the glass of the invention. Thorium fluoride or plutonium fluoride, or both, may be substituted for a part of the uranium fluoride.

The glass may be drawn into fibers or reduced to small beads having diameters from 1 to 50 microns. The resulting finely divided glass particles or fibers may be placed in fuel elements with a binder. The glass beads may be suspended in a moderator, such as water, or in a gas, and employed as the fuel for a fluidized bed nuclear reactor.

The glass compositions also have utility as color filters for photographic and other purposes. The glasses are

TABLE.—COMPOSITIONS AND DENSITY OF SOME HIGH URANIUM CONTAINING GLASS

| Glass No. | Mol Percent | | | Weight Percent | | | Wt. U Percent | Density, gm./ml. |
|---|---|---|---|---|---|---|---|---|
| | $UO_{8/3}$ | NaF | Al(PO$_3$)$_3$ | $UO_{8/3}$ | NaF | Al(PO$_3$)$_3$ | | |
| 1 | 0 | 80 | 20 | 0 | 38.8 | 61.2 | 0 | 2.669 |
| 2 | 0 | 75 | 25 | 0 | 32.3 | 67.7 | 0 | 2.701 |
| 3 | 5 | 75 | 20 | 14.3 | 32.0 | 53.7 | 12.2 | 2.980 |
| 4 | 5 | 70 | 25 | 12.9 | 26.8 | 60.3 | 11.0 | 2.975 |
| 5 | 10 | 70 | 20 | 25.5 | 26.6 | 47.9 | 21.7 | 3.244 |
| 6 | 10 | 65 | 25 | 23.1 | 22.5 | 54.4 | 19.6 | 3.209 |
| 7 | 15 | 65 | 20 | 34.4 | 22.3 | 43.3 | 29.2 | 3.519 |
| 8 | 15 | 60 | 25 | 31.6 | 18.9 | 49.5 | 26.9 | 3.352 |
| 9 | 20 | 60 | 20 | 41.8 | 18.8 | 39.4 | 35.5 | 3.760 |
| 10 | 20 | 55 | 25 | 38.7 | 15.9 | 45.4 | 32.9 | 3.619 |
| 11 | 22 | 53 | 25 | 41.2 | 14.8 | 44.0 | 35.0 | 3.667 |
| 12 | 22 | 58 | 20 | 44.4 | 17.6 | 38.0 | 37.7 | 3.828 |

Compositions are as charged.

Corresponding values for mol and weight percentages, weight of uranium, and density for Glass Nos. 1 to 12 are listed in the table. Glass Nos. 1 to 4 are included simply for comparison purposes, the preferred range comprises Glass Nos. 5 to 12 which show increasing amounts of uranium oxide from 10 to 22 mol percent and 25.5 to 44.4% by weight. Experiments indicate that using larger proportions of uranium oxide than 46% by weight resulted in lack of formation of a glass. The enclosed areas within the curves in the drawing are the glass formation regions for this system. The composition of Glass Nos. 1–12 are within those regions. The optimum proportions of fluophosphate glass of the present invention includes by weight 38.0% aluminum phosphate, 17.6% sodium fluoride, and 44.4% uranium oxide. Those weight percentages correspond to 22 mol percent aluminum phosphate, 58 mol percent sodium fluoride, and 20 mol percent uranium oxide.

Glass No. 12 is one of the best compositions for certain nuclear applications because of the highest amount of uranium oxide, i.e., 22 mol percent or 44.4% by weight. However, other glasses usable in nuclear work include Glass Nos. 5 to 11 having from 10 to 22 mol percent or from 25.5 to 41.2% uranium by weight, respectively. The uranium content of these glasses was analyzed chemically and found to be substantially within the charge proportions.

It was also found that the density of the glass can be calculated from the following equation:

$$1/d = 0.124 f_{UO_{8/3}} + 0.313 f_{NaF} + 0.398 f_{Al(PO_3)_3}$$

where $d$ is density in gm./ml. of the glass and $f_{UO_{8/3}}$, $f_{NaF}$, and $f_{Al(PO_3)_3}$ are weight fractions of $UO_{8/3}$, NaF, and Al(PO$_3$)$_3$ respectively. The resistivity against moisture attack was found to be high for the glasses containing a high amount of uranium.

green, and with the higher uranium content become an extremely dark green. Also, the green glasses of this invention may be employed for various illuminating and decorative applications, particularly when depleted uranium is used for the uranium oxide or uranium fluoride.

It will be understood that the above description and drawing are illustrative and not limiting.

What is claimed is:

1. A stable fluophosphate glass melting above about 800° C. consisting essentially of by weight from 34 to 75% of at least one phosphate of a metal of the group consisting of aluminum and beryllium; 15 to 43% of at least one fluoride or oxide selected from the group consisting of a univalent metal fluoride, a bivalent metal oxide, and boron oxide; and 2 to 46% of at least one compound selected from the group consisting of uranium oxide, uranium fluoride, plutonium oxide, plutonium fluoride, thorium oxide and thorium fluoride, with the proviso that there be present a fluoride selected from either of the two last groups.

2. The fluophosphate glass of claim 1, consisting essentially of by weight from 34 to 41% of at least one phosphate of metal of the group consisting of aluminum and beryllium; 15 to 35% of at least one fluoride or oxide selected from the group consisting of a univalent metal fluoride, a bivalent metal oxide, and boron oxide; and 20 to 46% of at least one compound selected from the group consisting of uranium oxide, uranium fluoride, plutonium oxide, plutonium fluoride, thorium oxide and thorium fluoride.

3. The fluophosphate glass of claim 1, consisting essentially of by weight from 38.0% of at least one phosphate of metal of the group consisting of aluminum and beryllium; 17.6% of at least one fluoride or oxide selected from the group consisting of a univalent metal fluoride, a bivalent metal oxide, and boron oxide; and 44.4% of at least one compound selected from the group consisting of uranium oxide, uranium fluoride, plutonium oxide, plutonium fluoride, thorium oxide and thorium fluoride.

4. The fluophosphate glass of claim 1, consisting essentially of an aluminum phosphate; at least one alkali metal fluoride selected from the group consisting of fluorides of lithium, sodium, potassium, rubidium, and cesium; and uranium oxide within the area defined by A–B–C–D–E of curve X of the drawing.

5. The fluophosphate glass of claim 1, consisting essentially by weight of 34 to 75% of aluminum phosphate; 15 to 43% of at least one alkali metal fluoride selected from the group consisting of fluorides of lithium, sodium, potassium, rubidium, and cesium; and 2 to 46% of uranium oxide.

6. The fluophosphate glass of claim 1, consisting essentially by weight of 34 to 41% of aluminum phosphate; 15 to 35% of at least one alkali metal fluoride selected from the group consisting of fluorides of lithium, sodium, potassium, rubidium, and cesium; and 20 to 46% of uranium oxide.

7. The fluophosphate glass of claim 1, consisting essentially by weight of 38.0% of aluminum phosphate; 17.6% of at least one alkali metal fluoride selected from the group consisting of fluorides of lithium, sodium, potassium, rubidium, and cesium; and 44.4% of uranium oxide.

8. The fluophosphate glass of claim 1, consisting essentially of 34 to 75% of aluminum phosphate, 15 to 34% of a compound selected from the group consisting of alkali metal oxide and alkali metal fluoride, and 2 to 46% uranium oxide, all parts by weight.

9. The fluophosphate glass of claim 1, consisting essentially by weight of 34 to 41% of aluminum phosphate, 15 to 35% of a compound selected from the group consisting of alkali metal oxide and alkali metal fluoride, and 20 to 46% of uranium oxide.

10. The fluophosphate glass of claim 1, consisting essentially by weight of 38.0% of aluminum phosphate, 17.6% of a compound selected from the group consisting of alkali metal oxide and alkali metal fluoride, and 44.4% of uranium oxide.

11. The fluophosphate glass of claim 1, consisting essentially of an aluminum phosphate, a fluoride of a univalent metal, and uranium oxide within the area B–C–D of curve Y of the drawing.

12. The fluophosphate glass of claim 1, consisting essentially of by weight 34 to 41% of an aluminum phosphate, 15 to 35% of an oxide of a bivalent metal, and 20 to 46% uranium fluoride.

13. The fluophosphate glass of claim 1, resulting from fusion of a batch consisting essentially of by weight 38.0% of an aluminum phosphate, 17.6% of sodium fluoride, and 44.4% of uranium oxide.

14. The fluophosphate glass of claim 1, resulting from fusion of a batch consisting essentially of 14 to 27% by weight sodium fluoride, and 20 to 45% by weight of uranium oxide and the balance aluminum phosphate.

15. The fluophosphate glass of claim 1, resulting from fusion of a batch consisting essentially of by weight: 38 to 55% aluminum phosphate, 14 to 27% sodium fluoride, and 20 to 45% uranium oxide.

16. The fluophosphate glass of claim 1, consisting essentially of by weight 34 to 41% aluminum phosphate, a compound selected from the group consisting of an alkali metal fluoride and a bivalent metal oxide, and 20 to 46% by weight uranium oxide.

17. The fluophosphate glass of claim 1, consisting essentially by weight of 34 to 54% aluminum phosphate; 15 to 30% of a compound selected from the g roup consisting of an alkali metal fluoride and a bivalent metal oxide, and one compound selected from a group consisting of uranium oxide and uranium fluoride in an amount having 30 to 45% by weight uranium.

18. The fluophosphate glass of claim 1, consisting essentially by weight of 34 to 45% aluminum phosphate; 15 to 25% of a compound selected from the group consisting of an alkali metal fluoride and a bivalent metal oxide, and one compound selected from a group consisting of uranium oxide and uranium fluoride in an amount having 40 to 45% by weight uranium.

19. The fluophosphate glass of claim 1, consisting essentially of aluminum phosphate, sodium fluoride, and uranium oxide within the area defined by 2–3–4 of curve X of the drawing.

References Cited

UNITED STATES PATENTS 3,063,923    11/1962    Mayer _____ 252—301.1

L. DEWAYNE RUTLEDGE, *Primary Examiner.*

BENJAMIN R. PADGETT, *Examiner.*

S. J. LECHERT, JR., *Assistant Examiner.*